(12) United States Patent
Takagi et al.

(10) Patent No.: US 8,942,508 B2
(45) Date of Patent: Jan. 27, 2015

(54) MOVEMENT CONTROL APPARATUS, MOVEMENT CONTROL METHOD AND PROGRAM

(71) Applicant: Sony Corporation, Tokyo (JP)

(72) Inventors: Yoshinori Takagi, Kanagawa (JP); Kentaro Fukazawa, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/840,971

(22) Filed: Mar. 15, 2013

(65) Prior Publication Data

US 2013/0259400 A1 Oct. 3, 2013

(30) Foreign Application Priority Data

Apr. 3, 2012 (JP) ................................. 2012-084728

(51) Int. Cl.
*G06T 7/20* (2006.01)
*G06F 3/00* (2006.01)

(52) U.S. Cl.
CPC ... *G06T 7/20* (2013.01); *G06F 3/00* (2013.01); *G06T 7/2033* (2013.01); *G06T 2207/20104* (2013.01)
USPC ........... 382/282; 382/104; 382/167; 382/254; 345/158; 345/156

(58) Field of Classification Search
CPC ........... G06F 3/00; G06T 7/20; G06T 7/2033; G06T 2207/20104
USPC .......... 382/282, 103, 190, 107; 345/158, 156, 345/169; 348/148, 118, 207.1
See application file for complete search history.

(56) References Cited

U.S. PATENT DOCUMENTS

| | | | | |
|---|---|---|---|---|
| 7,764,269 | B2 * | 7/2010 | Sohn et al. | 345/156 |
| 8,149,214 | B2 * | 4/2012 | Cho et al. | 345/158 |
| 2003/0160760 | A1 * | 8/2003 | Takakura et al. | 345/158 |
| 2007/0290999 | A1 * | 12/2007 | Cho et al. | 345/158 |
| 2008/0088583 | A1 * | 4/2008 | Cho et al. | 345/156 |
| 2009/0167678 | A1 * | 7/2009 | Orr et al. | 345/156 |
| 2010/0306793 | A1 * | 12/2010 | Vilei | 725/25 |
| 2011/0063216 | A1 * | 3/2011 | Orr et al. | 345/158 |
| 2012/0249799 | A1 * | 10/2012 | Shibata | 348/164 |
| 2013/0094713 | A1 * | 4/2013 | Nanri et al. | 382/106 |
| 2013/0120256 | A1 * | 5/2013 | Ishidera et al. | 345/158 |
| 2014/0044374 | A1 * | 2/2014 | Terasawa | 382/254 |

FOREIGN PATENT DOCUMENTS

| | | |
|---|---|---|
| JP | 2004-96487 | 3/2004 |
| JP | 2009-194681 | 8/2009 |

* cited by examiner

*Primary Examiner* — Mekonen Bekele
(74) *Attorney, Agent, or Firm* — Sony Corporation

(57) ABSTRACT

There is provided a movement control apparatus including a feature value calculation part calculating, on a basis of a movement direction of a region of interest defined based on input for moving the region and a target in which the region is provided, a feature value of the target in which the region is provided in the movement direction of the region on a per-unit distance basis regarding movement of the region, a movement value calculation part calculating a movement value by which the region is moved, based on the input, and a movement controller moving the region in the movement direction based on the calculated feature value and the calculated movement value.

15 Claims, 8 Drawing Sheets

FIG. 1
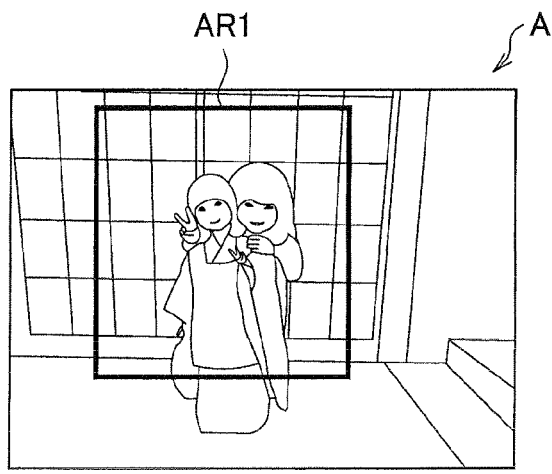
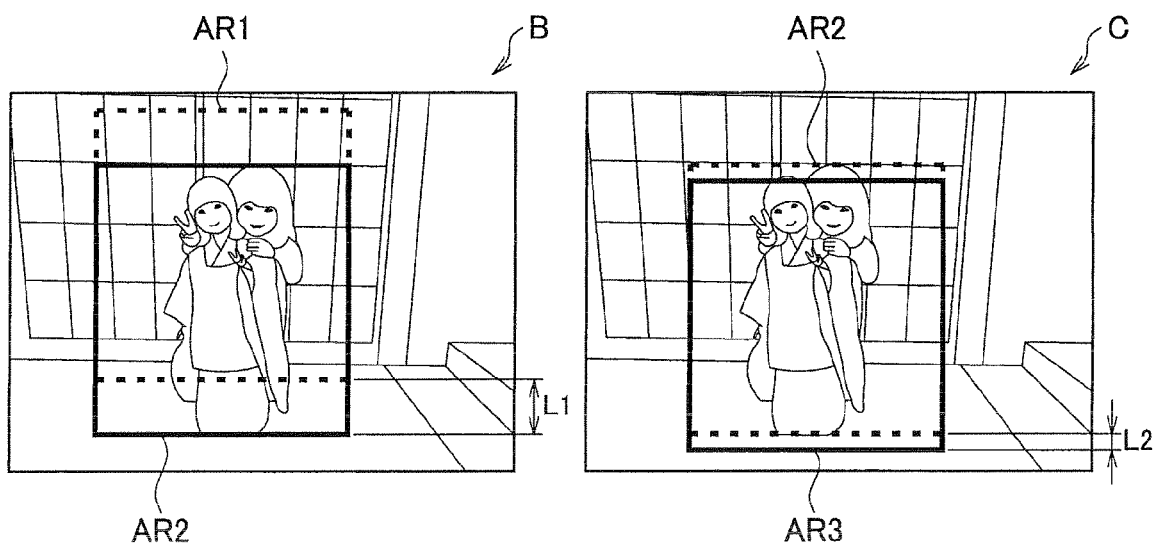

FIG. 2
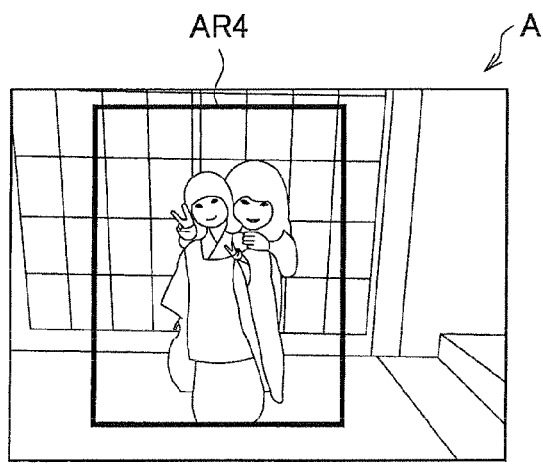
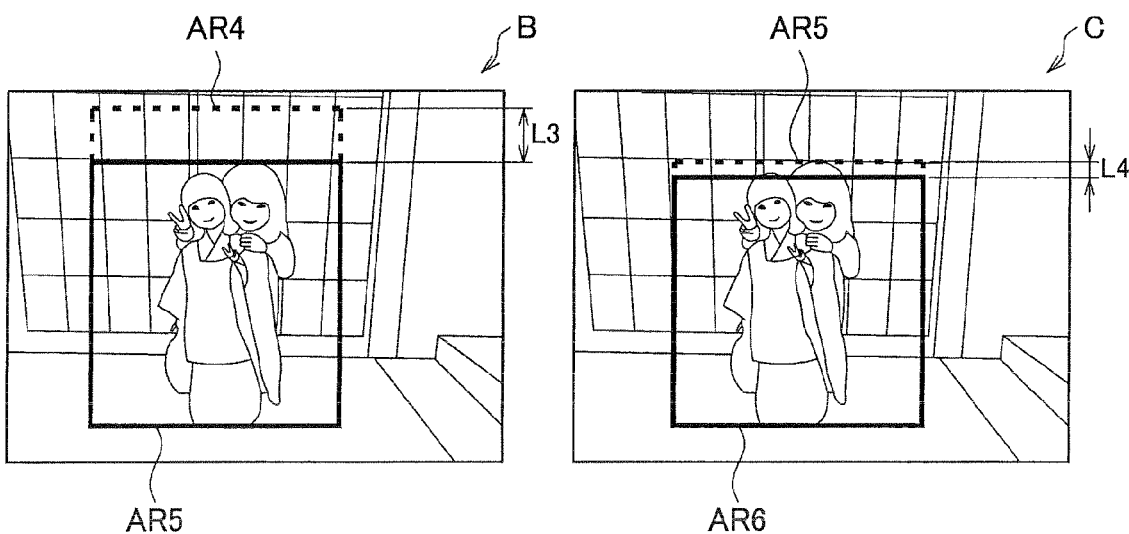

FIG. 4
|  | x1 | x2 | x3 | x4 | x5 |
|---|---|---|---|---|---|
| y0 | 0 | 0 | 0 | 0 | 0 |
| y1 | 0 | 2 | 0 | 0 | 4 |
| y2 | 0 | 4 | 1 | 2 | 8 |
| y3 | 2 | 8 | 3 | 4 | 12 |
| y4 | 6 | 8 | 7 | 4 | 14 |
| y5 | 8 | 11 | 11 | 5 | 16 |
| y6 | 30 | 34 | 21 | 10 | 32 |
| y7 | 41 | 55 | 35 | 13 | 37 |
| y8 | 62 | 60 | 56 | 16 | 57 |
|  | x1 | x2 | x3 | x4 | x5 | SUM IN HORIZONTAL DIRECTION (V1) | CUMULATIVE SUM (V2) |
|---|---|---|---|---|---|---|---|
| y1 | 0 | 2 | 0 | 0 | 4 | 6 | 6 |
| y2 | 0 | 2 | 1 | 2 | 4 | 9 | 15 |
| y3 | 2 | 4 | 2 | 2 | 4 | 14 | 29 |
| y4 | 4 | 0 | 4 | 0 | 2 | 10 | 39 |
| y5 | 2 | 3 | 4 | 1 | 2 | 12 | 51 |
| y6 | 22 | 23 | 10 | 5 | 16 | 76 | 127 |
| y7 | 11 | 21 | 14 | 3 | 5 | 54 | 181 |
| y8 | 21 | 5 | 21 | 3 | 20 | 70 | 251 |

FIG. 5

| | x1 | x2 | x3 | x4 | x5 | SUM IN HORIZONTAL DIRECTION (V1) | MOVEMENT VALUE 50 | MOVEMENT VALUE 100 | MOVEMENT VALUE 150 | CUMULATIVE SUM (V2) |
|---|---|---|---|---|---|---|---|---|---|---|
| y1 | 0 | 2 | 0 | 0 | 4 | 6 | 44 | 94 | 144 | 6 |
| y2 | 0 | 2 | 1 | 2 | 4 | 9 | 35 | 85 | 135 | 15 |
| y3 | 2 | 4 | 2 | 2 | 4 | 14 | 21 | 71 | 121 | 29 |
| y4 | 4 | 0 | 4 | 0 | 2 | 10 | 11 | 61 | 111 | 39 |
| y5 | 2 | 3 | 4 | 1 | 2 | 12 | -1 | 49 | 99 | 51 |
| y6 | 22 | 23 | 10 | 5 | 16 | 76 | | -27 | 23 | 127 |
| y7 | 11 | 21 | 14 | 3 | 5 | 54 | | | -31 | 181 |
| y8 | 21 | 5 | 21 | 3 | 20 | 70 | | | | 251 |

FIG. 6

| | x1 | x2 | x3 | x4 | x5 | SUM IN HORIZONTAL DIRECTION (V1) | MOVEMENT VALUE 130 | MOVEMENT VALUE 100 | MOVEMENT VALUE 70 | CUMULATIVE SUM (V2) |
|---|---|---|---|---|---|---|---|---|---|---|
| y1 | 0 | 2 | 0 | 0 | 4 | 6 | 114 | 94 | 64 | 6 |
| y2 | 0 | 2 | 1 | 2 | 4 | 9 | 105 | 85 | 55 | 15 |
| y3 | 2 | 4 | 2 | 2 | 4 | 14 | 96 | 71 | 46 | 29 |
| y4 | 4 | 0 | 4 | 0 | 2 | 10 | 81 | 61 | 31 | 39 |
| y5 | 2 | 3 | 14 | 1 | 12 | 32 | 49 | 29 | -1 | 71 |
| y6 | 12 | 13 | 10 | 5 | 16 | 56 | 3 | -27 | | 127 |
| y7 | 11 | 21 | 14 | 3 | 5 | 54 | -51 | | | 181 |
| y8 | 21 | 5 | 21 | 3 | 20 | 70 | | | | 251 |

MOVEMENT CONTROL APPARATUS, MOVEMENT CONTROL METHOD AND PROGRAM

BACKGROUND

The present disclosure relates to a movement control apparatus, a movement control method and a program.

Image processing for obtaining a desired image can include, for example, trimming. For example, a technology for obtaining an image of being easier to see by performing the trimming can include, for example, technologies described in Japanese Patent Laid-Open No. 2004-096487 and Japanese Patent Laid-Open No. 2009-194681.

SUMMARY

For example, in image processing such as trimming, it is important to set a region of interest (ROI). Moreover, for example, also in visual expression, composition and/or which region is to be cut out are important. Also from the perspective of visual expression, where to set a region of interest is important.

Herein, the region of interest is set, for example, on the basis of input based on operation with respect to an operation device operable by the user which input is such as input based on operation using an operation device such as buttons and a lever (for example, operation of pushing the button, inclining the lever, or the like) or an external operation device such as a remote controller and a keyboard (for example, operation of pushing a key, inclining the lever, or the like), and input based on operation with respect to a touch panel (for example, flick operation or the like). More specifically, for example, on the basis of input based on operation with respect to the operation devices as mentioned above, the region of interest is appropriately moved from an initial position, and thereby, the region of interest is set to the desired position.

However, for example, in the case of setting the region of interest on the basis of input based on operation with respect to the operation devices as mentioned above, the following problems, for example, arise regarding accuracy of movement of the region of interest and a distance by which the region of interest moves in response to the input based on the operation (hereinafter, sometimes referred to as "movement distance" or "movement amount").

When the region of interest is moved, putting a preference on the accuracy, the movement distance is compromised (for example, when moving by 1 [pixel] step by step, since the movement distance is short it takes time to move the region of interest to the position desired by the user).

When the region of interest is moved, putting a preference on the movement distance, the accuracy is compromised (for example, when moving by 50 [pixel] step by step, since the movement distance is long it is difficult to realize fine movement by less than 50 [pixel]).

In the present disclosure, it is desirable to propose a movement control apparatus, a movement control method and a program which is novel and improved and can manage both accuracy of movement of a region of interest and a movement distance of the region of interest in moving the region of interest.

According to an embodiment of the present disclosure, there is provided a movement control apparatus including a feature value calculation part calculating, on a basis of a movement direction of a region of interest defined based on input for moving the region and a target in which the region is provided, a feature value of the target in which the region is provided in the movement direction of the region on a per-unit distance basis regarding movement of the region, a movement value calculation part calculating a movement value by which the region is moved, based on the input, and a movement controller moving the region in the movement direction based on the calculated feature value and the calculated movement value.

Further, according to an embodiment of the present disclosure, there is provided a movement control method including calculating, on a basis of a movement direction of a region of interest defined based on input for moving the region and a target in which the region is provided, a feature value of the target in which the region is provided in the movement direction of the region on a per-unit distance basis regarding movement of the region, calculating a movement value by which the region is moved, based on the input, and moving the region in the movement direction based on the calculated feature value and the calculated movement value.

Further, according to an embodiment of the present disclosure, there is provided a program for causing a computer to execute calculating, on a basis of a movement direction of a region of interest defined based on input for moving the region and a target in which the region is provided, a feature value of the target in which the region is provided in the movement direction of the region on a per-unit distance basis regarding movement of the region, calculating a movement value by which the region is moved, based on the input, and moving the region in the movement direction based on the calculated feature value and the calculated movement value.

According to the present disclosure, both accuracy of movement of a region of interest and a movement distance of the region of interest in moving the region of interest can be managed.

BRIEF DESCRIPTION OF THE DRAWINGS

FIG. 1 is an explanatory drawing for explaining summary of a movement control method according to an embodiment;

FIG. 2 is an explanatory drawing for explaining the summary of the movement control method according to the embodiment;

FIG. 4 is an explanatory drawing illustrating one example of the feature value of the image calculated using the feature value calculation process according to the embodiment;

FIG. 5 is an explanatory drawing for explaining a movement control process according to the embodiment;

FIG. 6 is an explanatory drawing for explaining the movement control process according to the embodiment;

DETAILED DESCRIPTION OF THE EMBODIMENT(S)

Figure 3:
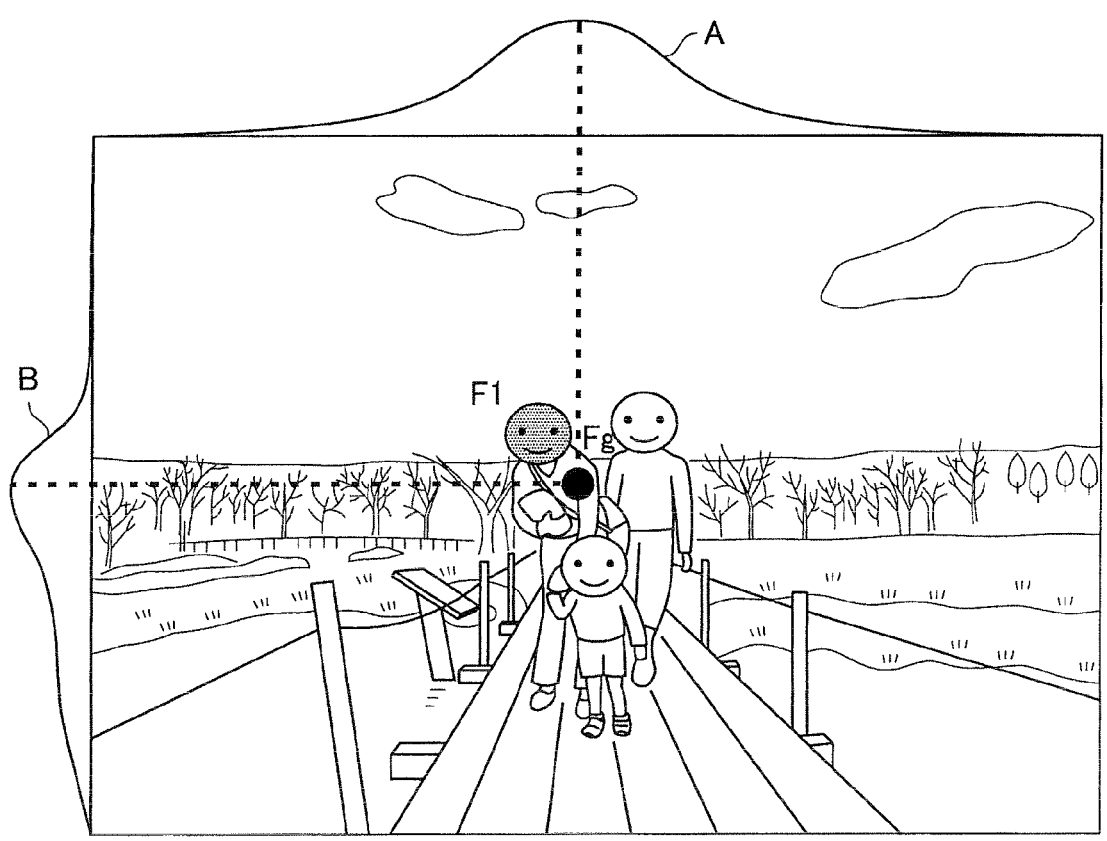
FIG. 3 is an explanatory drawing illustrating summary of one example of a feature value of the image calculated using a feature value calculation process according to the embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Incidentally, the description is made in the following order below.

1. Movement Control Method According to Embodiment
2. Movement Control Apparatus According to Embodiment
3. Program According to Embodiment

Movement Control Method According to Embodiment

Before a configuration of a movement control apparatus according to the embodiment is described, at first, a movement control method according to the embodiment is described. The movement control method according to the embodiment is described below, exemplifying a case where the movement control apparatus according to the embodiment performs processes according to the movement control method according to the embodiment.

Summary of Movement Control Method According to Embodiment

As mentioned above, when putting a preference on any one of accuracy of movement of a region of interest and a movement distance of the region of interest, the other is compromised.

Hence, the movement control apparatus according to the embodiment manages both accuracy of movement of a region of interest and a movement distance of the region of interest in moving the region of interest by using a feature value of a target in which the region of interest is provided.

Herein, the target in which the region of interest is provided according to the embodiment can include, for example, an image. Moreover, the image according to the embodiment can include, for example, a moving image, a still image, an image based on a markup language such as HTML (HyperText Markup Language), and the like. In addition, the target in which the region of interest is provided according to the embodiment is not limited to the image. For example, the target in which the region of interest is provided according to the embodiment may includes a plurality of alternatives and is such as a list having a plurality of alternatives, hundreds of those or thousands of those.

Moreover, the region of interest according to the embodiment can include, for example, a region on which image processing such as trimming is performed (one example of the region of interest in case where the target in which the region of interest is provided according to the embodiment is an image). The region of interest according to the embodiment may be, for example, a region corresponding to the whole image, a region corresponding to a portion out of the image which portion is displayed on the display screen, a region with a prescribed size, or a point in a portion out of the image which portion is displayed on the display screen.

In addition, the region of interest according to the embodiment is not limited, for example, to a region on which image processing such as trimming is performed. For example, the region of interest according to the embodiment may be a region for selecting one or two or more alternatives from a list having a plurality of alternatives or the like (one example of the region of interest in case where the target in which the region of interest is provided according to the embodiment includes a plurality of alternatives).

Moreover, the region of interest according to the embodiment can include, for example, a rectangular region, whereas the region of interest according to the embodiment is not limited to a rectangular region. For example, the region of interest according to the embodiment may be a region with various shapes such as a circle, an ellipse, a trapezoid and a polygon.

Moreover, movement of the region of interest according to the embodiment can include, for example, parallel movement of the region of interest that region of interest is moved with its size being held. In addition, the movement of the region of interest according to the embodiment is not limited to the above. For example, the region of interest according to the embodiment may be change in size of the region of interest that one portion of the region of interest is fixed and the other portion is moved.

Hereafter, the description is made, exemplifying a case where the target in which the region of interest is provided according to the embodiment is an image and the region of interest is a region for defining a region in which the image undergoes trimming. Moreover, hereafter, the description is made, exemplifying a case where the region of interest according to the embodiment is a rectangular region.

FIG. 1 is an explanatory drawing for explaining summary of the movement control method according to an embodiment. FIG. 1 illustrates one example of parallel movement of a region of interest. Moreover, portion A illustrated in FIG. 1 illustrates one example of a state before movement of the region of interest, and portion B illustrated in FIG. 1 illustrates one example of a state of the movement of the region of interest from the state illustrated in portion A illustrated in FIG. 1. And portion C illustrated in FIG. 1 illustrates one example of a state of the movement of the region of interest from the state illustrated in portion B illustrated in FIG. 1.

For example, upon input operation by the user, the movement control apparatus according to the embodiment performs parallel movement of the region of interest. Herein, the movement control apparatus according to the embodiment makes a movement amount (movement distance) of the region of interest large at a feature value of the image being small (for example, L1 illustrated in portion B of FIG. 1), and makes the movement amount of the region of interest smaller at the feature value of the image being large (for example, L2 illustrated in portion C of FIG. 1; herein, L2<L1). In addition, the feature value according to the embodiment (feature value of a target in which a region of interest is provided) is described later.

For example, as illustrated in FIG. 1, by using the feature value of the image, the movement control apparatus according to the embodiment performs parallel movement of the region of interest more preferentially for the movement distance of the region of interest as the feature value of the image is smaller, and performs parallel movement of the region of interest more preferentially for accuracy of movement of the region of interest as the feature value of the image is larger. Accordingly, by using the feature value of the image, the movement control apparatus according to the embodiment can manage moth accuracy of movement of the region of interest and a movement distance of the region of interest in moving the region of interest.

In addition, the movement of the region of interest according to the embodiment is not limited to parallel movement of the region of interest as illustrated in FIG. 1, as mentioned above. FIG. 2 is an explanatory drawing for explaining summary of the movement control method according to the embodiment. FIG. 2 illustrates one example of change of the region of interest in size. Moreover, portion A illustrated in FIG. 2 illustrates one example of a state before movement of the region of interest, and portion B illustrated in FIG. 2 illustrates one example of a state of the movement of the region of interest from the state illustrated in portion A illustrated in FIG. 2. And portion C illustrated in FIG. 2 illustrates one example of a state of the movement of the region of interest from the state illustrated in portion B illustrated in FIG. 2.

For example, upon input operation by the user, the movement control apparatus according to the embodiment moves the upper side of the region of interest, fixing the position of the lower side of the region of interest. Herein, the movement control apparatus according to the embodiment makes a movement amount of the upper side of the region of interest large at a feature value of the image being small (for example, L3 illustrated in portion B of FIG. 2), and makes the movement amount of the upper side of the region of interest smaller at the feature value of the image being large (for example, L4 illustrated in portion C of FIG. 2; herein, L4<L3).

For example, as illustrated in FIG. 2, by using the feature value of the image, the movement control apparatus according to the embodiment changes the size of the region of interest more preferentially for a movement distance of the region of interest as the feature value of the image is smaller, and changes the size of the region of interest more preferentially for accuracy of movement of the region of interest as the feature value of the image is larger. Accordingly, by using the feature value of the image, the movement control apparatus according to the embodiment can manage both accuracy of movement of the region of interest and a movement distance of the region of interest in moving the region of interest.

Processes According to Movement Control Method According to Embodiment

Next, the processes according to the movement control method according to the embodiment are described more specifically. The movement control apparatus according to the embodiment calculates a feature value of a target in which a region of interest is provided for each unit distance regarding movement of the region of interest (feature value calculation process). Herein, the unit distance regarding movement of the region of interest according to the embodiment can include, for example, N (N is an integer) [pixel] (for example, in case where the target in which a region of interest is provided is an image), and N rows (for example, in case where the target in which a region of interest is provided is a list).

Moreover, the movement control apparatus according to the embodiment calculates a movement value by which the region of interest is moved (movement value calculation process). Then, the movement control apparatus according to the embodiment moves the region of interest on the basis of the calculated feature value and the calculated movement value (movement control process).

(1) Feature Value Calculation Process

The movement control apparatus according to the embodiment calculates a feature value of an image (one example of the target in which a region of interest is provided; similarly hereinafter) in a movement direction of the region of interest for each unit distance on the basis of the movement direction of the region of interest, which is defined based on input for moving the region of interest, and the image.

Herein, the input according to the embodiment can include, for example, input with respect to an operation device operable by the user which input is such as input based on operation using an operation device such as buttons and a lever (for example, operation of pushing the button, inclining the lever, or the like) or an operation device such as a remote controller and a keyboard (for example, operation of pushing a key, inclining the lever, or the like), and input based on operation with respect to a touch panel (for example, touching operation such as flick operation (or, operation corresponding to the touching operation)). The movement control apparatus according to the embodiment specifies, for example, an operation direction and an operation amount on the basis of an operation signal transmitted from an operation part (mentioned later) included in the movement control apparatus according to the embodiment, and/or an external operation signal received from an external operation device.

The movement control apparatus according to the embodiment sets, for example, the operation direction specified from the operation signal or the like as a movement direction of the region of interest. Moreover, the movement control apparatus according to the embodiment calculates, for example, a movement value according to the embodiment based on the operation amount specified from the operation signal or the like, in the movement value calculation process mentioned later.

For example, when the movement direction of the region of interest is specified as mentioned above, the movement control apparatus according to the embodiment calculates, for example, the feature value of the image by processing the image which is a target in which a region of interest is provided. More specifically, the movement control apparatus according to the embodiment calculates, for example, items (A) to (G) described below as the feature value of the image. The feature value of the image calculated by processing the image is not limited to the items (A) to (G) described below. For example, the movement control apparatus according to the embodiment can also calculate an arbitrary value which can be calculated by processing the image and indicates the feature of the image as the feature value of the image.

(A) An adjacent pixel difference, a sum of adjacent pixel differences, a linear sum of adjacent pixel differences, a square sum of adjacent pixel differences, a square sum of average values of pixel values of plural pixels, or the like which indicate activity (feature) of the image.

(B) A differential absolute value between the image (original image) and the image after blur processing such as Gaussian blur processing.

(C) A distance between a position in the image based on face recognition result and each position in the image along the movement direction of the region of interest.

(D) A distance between a position in the image based on an edge detection result and each position in the image along the movement direction of the region of interest.

(E) A value moving in uniform motion on a transform image (concentration image) which value is according to a technology described in Japanese Patent Laid-Open No. 2006-313511 applied by the applicants.

(F) A motion vector corresponding to each pixel (in case where the image is a moving image).

(G) A value representing relation between motion of the entirety of the image and motion of each pixel.

FIG. 3 is an explanatory drawing illustrating summary of one example of a feature value of the image calculated using the feature value calculation process according to the embodiment. Herein, portions A and B illustrated in FIG. 3 illustrate one example of change in magnitude of the feature value of the image in the case of item (C) described above. Moreover, FIG. 3 illustrates the case that the movement control apparatus according to the embodiment sets the barycenter position Fg recognized from the image as a position in the image based on a face recognition result. In addition, the position in image according to the embodiment based on the face recognition result is not limited to the barycenter position recognized from the image. For example, the movement control apparatus according to the embodiment can set a position of the face of a specific person such as F1 illustrated in FIG. 3 as the position in the image based on the face recognition result.

FIG. 4 is an explanatory drawing illustrating one example of feature values of the image calculated using the feature value calculation process according to the embodiment. Herein, FIG. 4 illustrates one example of feature values of the image in case where the unit distance regarding movement of the region of interest according to the embodiment is 1 [pixel]. Moreover, FIG. 4 illustrates values of adjacent pixel differences in the vertical direction (one example of feature values of the image) which values are calculated in case where the region of interest is a region of 5 pixels×8 pixels (pixels in the horizontal direction x of the image×pixels in the vertical direction y of the image) and the movement control apparatus according to the embodiment moves the upper side of the relevant region downward in the vertical direction (one example of a case of changing the size of the region of interest). Portion A illustrated in FIG. 4 illustrates one example of feature values of the image which values the movement control apparatus according to the embodiment calculates with respect to the region of 5 pixels×8 pixels using the feature value calculation process. Portion B illustrated in FIG. 4 illustrates another example of feature values of the image which values the movement control apparatus according to the embodiment calculates with respect to the region of 5 pixels×8 pixels using the feature value calculation process.

When moving the upper side of the region of interest downward in the vertical direction, the movement control apparatus according to the embodiment calculates values of adjacent pixel differences between adjacent pixels in the downward direction in the image corresponding to the movement direction (direction corresponding to the bottom in portion A of FIG. 4) as the feature values of the image as illustrated in portion A of FIG. 4, for example. Herein, in the example illustrated in portion A of FIG. 4, feature values in a portion of y position 6 to y position 8 are larger in values of feature values than feature values in a portion of y position 1 to y position 5. This indicates that the portion of y position 1 to y position 5 is a portion such, for example, as the blue sky which is small in change and that the portion of y position 6 to y position 8 is a portion such, for example, as a person which is large in change.

Moreover, when moving the upper side of the region of interest downward in the vertical direction, the upper side of the region of interest moves parallelly. Therefore, the movement control apparatus according to the embodiment may calculate "sums in the horizontal direction" obtained by adding the values of the adjacent pixel differences in the horizontal direction of the image (V1 illustrated in portion B of FIG. 4) as the feature values of the image as illustrated in portion B of FIG. 4, for example, and may calculate "cumulative sums" obtained by adding the sums in the horizontal direction in the vertical direction of the image (V2 illustrated in portion B of FIG. 4) as the feature values of the image.

In addition, the feature value calculation process according to the embodiment is not limited to the calculation due to processing the image which is a target in which a region of interest is provided. For example, when there is history information indicating results obtained by previously performing the feature value calculation process on the image which is a target in which a region of interest is provided (for example, data including already calculated feature values of the image), the movement control apparatus according to the embodiment may set feature values of the image indicated by the history information as the feature values of the image which is a target in which a region of interest is provided.

Moreover, when a target in which a region of interest is provided includes a plurality of alternatives and is such as a list having a plurality of alternatives, the movement control apparatus according to the embodiment is to calculate, for example, the numbers of times indicated by the history information as the feature values of a target in which a region of interest is provided on the basis of the history information including the numbers of times where individual alternatives have been selected.

(2) Movement Value Calculation Process

The movement control apparatus according to the embodiment calculates a movement value by which a region of interest is moved, on the basis of the input for moving the region of interest.

More specifically, the movement control apparatus according to the embodiment specifies, for example, an operation amount on the basis of an operation signal transmitted from an operation part (mentioned later). Then, the movement control apparatus according to the embodiment calculates a movement value by performing calculation, for example, indicated in formula 1 below based on the specified operation amount. Herein, "Y" indicated in formula 1 denotes a movement value, and "x" indicated in formula 1 denotes an operation amount.

$$Y=f(x) \tag{formula 1}$$

For example, in case of "f(x)=5x", when operation amounts x are "10", "20" and "30", movement values Y are "50", "100" and "150", respectively. In addition, "f(x)" in formula 1 is not limited to "f(x)=5x". For example, the movement control apparatus according to the embodiment can calculate the movement values using various functions according to X such as a quadratic function and an exponential function, or various functions according to X such as a monomial according to x and a polynomial according to X.

In addition, the movement value calculation process in the movement control apparatus according to the embodiment is not limited to the above. For example, the movement control apparatus according to the embodiment may adjust the movement value calculated based on the input for moving the region of interest, for example, as mentioned above on the bases of history information indicating history of the input for moving the region of interest.

For example, when the operation amount specified at the time point of time t is "20", in case where there is history information indicating history of the operation amount corresponding to time t−1, the movement control apparatus according to the embodiment adjusts the movement value to be calculated, based on the relevant history information. More specifically, when the movement control apparatus according to the embodiment, for example, adjusts so as to be "f(x)=5x" and to give 3 times of the movement value with respect to the value of a difference between the operation amount at time t−1 and the operation amount at time t, the movement control apparatus according to the embodiment calculates the adjusted movement value, for example, as in the cases indicated in items (a) to (c) below.

(a) Case 1: in case where the operation amount increases from "10" (time t−1) to "20" (time t).

Movement value $Y=5\times 20+3\times(20-10)=130$ (b) Case 2: in case where the operation amount does not change like from "20" (time t−1) to "20" (time t).

Movement value $Y=5\times 20+3\times(20-20)=100$ (c) Case 3: in case where the operation amount decreases from "30" (time t−1) to "20" (time t).

Movement value $Y=5\times 20+3\times(20-30)=70$

For example, as indicated in items (a) to (c) above, the movement control apparatus according to the embodiment adjusts the movement value on the basis of the history of the operation amount which is indicated by the history information and based on the input for moving the region of interest. Namely, in case of using the history information, the movement control apparatus according to the embodiment changes the movement value on the basis of the history of the input even when the same input in operation amount is made. Therefore, the movement control apparatus according to the embodiment can calculate the movement value which is more in conformity with the user's intention by adjusting the movement value on the basis of the history information.

In addition, in the above, the example of adjusting the movement value using history of an operation amount at the time point which is previous by one for simplicity of the description, whereas the process according to adjusting the movement value based on history information is not limited to the above. For example, the movement control apparatus according to the embodiment may adjust the movement value on the basis of history information indicating history of an operation amount at an arbitrary time point. Moreover, the movement control apparatus according to the embodiment, for example, can adjust the movement value using various processes based on history information such as usage of increment from a weighted movement average in which history of the operation amount which is chronologically closer is given more weight, setting increment from a movement average previously from several frames as a reference of adjusting the movement value (3) Movement Control Process The movement control apparatus according to the embodiment moves the region of interest in the movement direction specified from the operation signal or the like on the basis of the feature value calculated in the process (1) mentioned above (feature value calculation process) and the movement value calculated in the process (2) mentioned above (movement value calculation process).

Hereafter, the movement control process according to the embodiment is described more specifically, mainly exemplifying a case where the movement control apparatus according to the embodiment moves the upper side of the relevant region downward in the vertical direction (one example of a case of changing the size of the region of interest).

[3-1] First Example of Movement Control Process

The movement control apparatus according to the embodiment moves, for example, the region of interest in the movement direction by a unit distance, and subtracts the feature value corresponding to the unit distance by which the movement has been made from the calculated movement value. Namely, the movement value according to the embodiment corresponds, for example, to movement costs for the movement of the region of interest. Then, the movement control apparatus according to the embodiment determines, for example, whether or not the value obtained by the subtraction is 0 or less or is smaller than 0.

When the value obtained by the subtraction is not 0 or less or is not smaller than 0, the movement control apparatus according to the embodiment moves the region of interest in the movement direction by a unit distance, and subtracts the feature value corresponding to the unit distance by which the movement has been made from the movement value again. Moreover, when the value obtained by the subtraction is 0 or less or is smaller than 0, the movement control apparatus according to the embodiment ends the movement of the region of interest.

FIG. 5 and FIG. 6 are explanatory drawings for explaining the movement control process according to the embodiment. Herein, FIG. 5 illustrates calculation of feature values illustrated in portion B of FIG. 4 in the process (1) mentioned above (feature value calculation process) and calculation of movement values based on an operation amount using formula 1 in the process (2) mentioned above (movement value calculation process). More specifically, FIG. 5 illustrates calculation of movement values indicating "50", "100" and "150", respectively, mentioned above in the process (2) mentioned above (movement value calculation process). Moreover, FIG. 6 illustrates calculation of feature values illustrated in portion B of FIG. 4 in the process (1) mentioned above (feature value calculation process) and adjustment of movement values based on history information in the process (2) mentioned above (movement value calculation process). More specifically, FIG. 6 illustrates calculation of movement values indicating "130", "100" and "70", respectively, mentioned above in the process (2) mentioned above (movement value calculation process).

At first, an example of the movement control process in case where the movement values based on operation amounts are calculated is described with reference to FIG. 5. The movement control apparatus according to the embodiment moves the upper side of the region of interest to y=1 corresponding to a unit distance. Then, the movement control apparatus according to the embodiment subtracts a feature value "6" corresponding to the movement to y=1 (value of V1 illustrated in FIG. 5) from the movement values "50", "100" and "150". After the subtraction, the movement control apparatus according to the embodiment determines whether or not the values of the movement values obtained by the subtraction "44", "96" and "146" are 0 or less (or are smaller than 0; similarly hereinafter). When the movement to y=1, since the movement values are not 0 or less, the movement control apparatus according to the embodiment moves the upper side of the region of interest to y=2, which corresponds to a unit distance based on y=1, again. Then, the movement control apparatus according to the embodiment subtracts a feature value "9" corresponding to the movement to y=2 (value of V1 illustrated in FIG. 5) from the movement values "44", "94" and "144".

When it is determined that the value of the movement value obtained by the subtraction, which value is obtained by the repeated movements, subtractions and determinations mentioned above, is 0 or less, the movement control apparatus according to the embodiment ends the movement of the upper side of the region of interest. In the example illustrated in FIG. 5, in case where the movement value is "50", the value of the movement value obtained by the subtraction at y=5 is 0 or less, and in case where the movement value is "100", the value of the movement value obtained by the subtraction at y=6 is 0 or less. Moreover, in the example illustrated in FIG.

5, in case where the movement value is "150", the value of the movement value obtained by the subtraction at y=7 is 0 or less.

Accordingly, in the example illustrated in FIG. 5, in case where the movement value is "50" the upper side of the region of interest moves to y=5, in case where the movement value is "100" it moves to y=6, and in case where the movement value is "150" it moves to y=7. Namely, in the example illustrated in FIG. 5, while the ratio of the operation amounts which are the base of the movement values in the process (1) mentioned above (feature value calculation process) is "1:2:3", the movement amounts by which the upper side of the region of interest moves are "5 pixels:6 pixels:7 pixels".

Next, an example of the movement control process in case where the movement values are adjusted based on history information is described with reference to FIG. 6. The movement control apparatus according to the embodiment moves the upper side of the region of interest to y=1 corresponding to a unit distance. Then, the movement control apparatus according to the embodiment subtracts a feature value "6" corresponding to the movement to y=1 (value of V1 illustrated in FIG. 6) from the movement values "130", "100" and "70". After the subtraction, the movement control apparatus according to the embodiment determines whether or not the values of the movement values obtained by the subtraction "124", "94" and "64" are 0 or less. When the movement to y=1, since the movement values are not 0 or less, the movement control apparatus according to the embodiment moves the upper side of the region of interest to y=2, which corresponds to a unit distance based on y=1, again. Then, the movement control apparatus according to the embodiment subtracts a feature value "9" corresponding to the movement to y=2 (value of V1 illustrated in FIG. 5) from the movement values "124", "94" and "64".

When it is determined that the value of the movement value obtained by the subtraction, which value is obtained by the repeated movements, subtractions and determinations mentioned above, is 0 or less, the movement control apparatus according to the embodiment ends the movement of the upper side of the region of interest. In the example illustrated in FIG. 6, in case where the movement value is "130" the value of the movement value obtained by the subtraction at y=7 is 0 or less, and in case where the movement value is "100" the value of the movement value obtained by the subtraction at y=6 is 0 or less. Moreover, in the example illustrated in FIG. 6, in case where the movement value is "70" the value of the movement value obtained by the subtraction at y=5 is 0 or less.

Accordingly, in the example illustrated in FIG. 6, in case where the movement value is "130" the upper side of the region of interest moves to y=7, in case where the movement value is "100" it moves to y=6, and in case where the movement value is "70" it moves to y=5. Namely, in the example illustrated in FIG. 6, even when the operation amounts which are the base of the movement values are the same, the movement amounts by which the upper side of the region of interest moves are "7 pixels:6 pixels:5 pixels" by adjusting the movement values on the basis of history information in the process (1) mentioned above (feature value calculation process).

[3-2] Second Example of Movement Control Process

The movement control process in the movement control apparatus according to the embodiment is not limited to the process according to the above-mentioned first example. For example, the movement control apparatus according to the embodiment sequentially subtracts feature values for unit distances from the movement value in the movement direction. Then, the movement control apparatus according to the embodiment moves the region of interest by a distance obtained by multiplying a unit distance by the subtraction times when the value obtained by the subtraction becomes 0 or less or becomes smaller than 0.

The movement control process according to a second example is described more specifically, exemplifying FIG. 5 and FIG. 6.

At first, an example of the movement control process in case where the movement values based on operation amounts are calculated is described with reference to FIG. 5. The movement control apparatus according to the embodiment sequentially subtracts a feature value "6" corresponding to the movement to y=1 (value of V1 illustrated in FIG. 5), a feature value "9" corresponding to the movement to y=2 (value of V1 illustrated in FIG. 5), . . . , from the movement values "50", "100" and "150". Moreover, the movement control apparatus according to the embodiment adds 1 to the number of times of subtraction for each subtraction, and determines whether or not the values of the movement values obtained by the subtraction. is 0 or less. For example, in the example illustrated in FIG. 5, in case where the movement value is "50" the value of the movement value obtained by the subtraction at y=5 is 0 or less, and in case where the movement value is "100" the value of the movement value obtained at y=6 is 0 or less, and in case where the movement value is "150" the value of the movement value obtained at y=7 is 0 or less. Namely, in the example illustrated in FIG. 5, in case where the movement value is "50" the number of times of subtraction is 5, in case where the movement value is "100" the number of times of subtraction is 6, and in case where the movement value is "150" the number of times of subtraction is 7.

Accordingly, in the example illustrated in FIG. 5, in case where the movement value is "50", the movement control apparatus according to the embodiment moves the upper side of the region of interest by 5 pixels which equals "1 [pixel] (one example of the unit distance)×5 [times]". Moreover, in the example illustrated in FIG. 5, in case where the movement value is "100", the movement control apparatus according to the embodiment moves the upper side of the region of interest by 6 pixels which equals "1 [pixel] (one example of the unit distance)×6 [times]". And, in the example illustrated in FIG. 5, in case where the movement value is "150", the movement control apparatus according to the embodiment moves the upper side of the region of interest by 7 pixels which equals "1 [pixel] (one example of the unit distance)×7 [times]". Namely, also in case where the movement control process according to the second example is performed, similarly to the case where the movement control process according to the first example mentioned above is performed, in the example illustrated in FIG. 5, while the ratio of the operation amounts which are the base of the movement values in the process (1) mentioned above (feature value calculation process) is "1:2:3", the movement amounts by which the upper side of the region of interest moves are "5 pixels:6 pixels:7 pixels".

Next, an example of the movement control process in case where the movement values are adjusted based on history information is described with reference to FIG. 6. The movement control apparatus according to the embodiment sequentially subtracts a feature value "6" corresponding to the movement to y=1 (value of V1 illustrated in FIG. 5), a feature value "9" corresponding to the movement to y=2 (value of V1 illustrated in FIG. 5), . . . , from the movement values "130", "100" and "70". Moreover, the movement control apparatus according to the embodiment adds 1 to the number of times of subtraction for each subtraction, and determines whether or not the value of the movement value obtained by the subtraction is 0 or less. For example, in the example illustrated in FIG. 6, in case where the movement value is "130" the value of the movement value obtained by the subtraction at y=7 is 0 or less, in case where the movement value is "100" the value of the movement value obtained by the subtraction at y=6 is 0 or less, and in case where the movement value is "70" the value of the movement value obtained by the subtraction at y=5 is 0 or less. Namely, in the example illustrated in FIG. 6, in case where the movement value is "130" the number of times of subtraction is 7, in case where the movement value is "100" the number of times of subtraction is 6, and in case where the movement value is "70" the number of times of subtraction is 5.

Accordingly, in the example illustrated in FIG. 6, in case where the movement value is "130" the movement control apparatus according to the embodiment moves the upper side of the region of interest by 7 pixels which equals "1 [pixel] (one example of the unit distance)×7 [times]". Moreover, in the example illustrated in FIG. 6. in case where the movement value is "100" the movement control apparatus according to the embodiment moves the upper side of the region of interest by 6 pixels which equals "1 [pixel] (one example of the unit distance)×6 [times]". And, in the example illustrated in FIG. 6, in case where the movement value is "70" the movement control apparatus according to the embodiment moves the upper side of the region of interest by 5 pixels which equals "1 [pixel] (one example of the unit distance)×5 [times]". Namely, also in case where the movement control process according to the second example is performed, similarly to the case where the movement control process according to the first example mentioned above is performed, in the example illustrated in FIG. 6, even when the operation amounts which are the base of the movement values are the same, the movement amounts by which the upper side of the region of interest moves are "7 pixels:6 pixels:5 pixels" by adjusting the movement values on the basis of history information in the process (1) mentioned above (feature value calculation process).

[3-3] Other Examples of Movement Control Process

In addition, the movement control process in the movement control apparatus according to the embodiment is not limited to the process according to the first example mentioned above and the process according to the second example. For example, in the process according to the first example mentioned above, an example of performing subtraction and determination after performing movement of the region of interest is described, whereas the movement control apparatus according to the embodiment may determine, after the subtraction, whether or not the movement value obtained by the subtraction is 0 or less, and in case of not being 0 or less, may perform the movement of the region of interest.

Moreover, in the process according to the second example mentioned above, an example of sequentially subtracting feature values for unit distances from the movement value in the movement direction is described, whereas, in case where "cumulative sums" (V2 illustrated in FIG. 5 or V2 illustrated in FIG. 6) have been already calculated, the movement control apparatus according to the embodiment may, for example, subtract the cumulative sums corresponding to respective positions from the movement value, for example, as illustrated in FIG. 5 and FIG. 6. When subtracting the cumulative sums corresponding to the respective positions from the movement value, the movement control apparatus according to the embodiment moves the region of interest to the position, for example, where the value obtained by the subtraction is 0 or less or is smaller than 0 and the distance is smallest.

The movement control apparatus according to the embodiment performs, for example, the process (1) mentioned above (feature value calculation process), the process (2) mentioned above (movement value calculation process) and the process (3) mentioned above (movement control process) as processes according to the movement control method.

Herein, in the process (3) mentioned above (movement control process), the movement control apparatus according to the embodiment moves the region of interest in the movement direction specified from an operation signal or the like on the basis of the feature value calculated in the process (1) mentioned above (feature value calculation process) and the movement value calculated in the process (2) mentioned above (movement value calculation process). Therefore, for example, as illustrated in FIG. 1 and FIG. 2, the movement control apparatus according to the embodiment can move the region of interest more preferentially for the movement distance of the region of interest as the feature value of the image is smaller, and can move the region of interest more preferentially for accuracy of movement of the region of interest as the feature value of the image is larger.

Accordingly, the movement control apparatus according to the embodiment performs, for example, the process (1) mentioned above (feature value calculation process) to the process (3) mentioned above (movement control process), and thereby, can manage both accuracy of movement of the region of interest and a movement distance of the region of interest in moving the region of interest.

In addition, the processes according to the movement control method according to the embodiment are not limited to the process (1) mentioned above (feature value calculation process) to the process (3) mentioned above (movement control process). For example, when input for moving the region of interest is detected from an operation signal or the like transmitted from an operation part (mentioned later), the movement control apparatus according to the embodiment may record history information indicating history of the input for moving the region of interest (record control process).

The movement control apparatus according to the embodiment specifies the operation direction and the operation amount, for example, on the basis of the operation signal or the like transmitted from the operation part (mentioned later), and records data including the specified operation amount or data including the operation amount and operation direction in a recording medium, as the history information.

Herein, the recording medium according to the embodiment can include, for example, a storage included in the movement control apparatus according to the embodiment (mentioned later), an external recording medium which is removable and connected to the movement control apparatus according to the embodiment, a recording medium included in an external apparatus connected to the movement control apparatus according to the embodiment via a network (or directly) in a wired manner or a wireless manner, and the like. Moreover, the network according to the embodiment can include, for example, a wired network such as a LAN (Local Area Network) and a WAN (Wide Area Network), a wireless network such as a wireless LAN (WLAN: Wireless Local Area Network), the Internet using a communication protocol such as TCP/IP (Transmission Control Protocol/Internet Protocol), and the like. For example, when the history information is recorded in the recording medium included in the external apparatus, the movement control apparatus according to the embodiment transmits the history information and a record instruction for recording the relevant history information to the external apparatus, and thereby, the history information is recorded in the recording medium.

Figure 7:
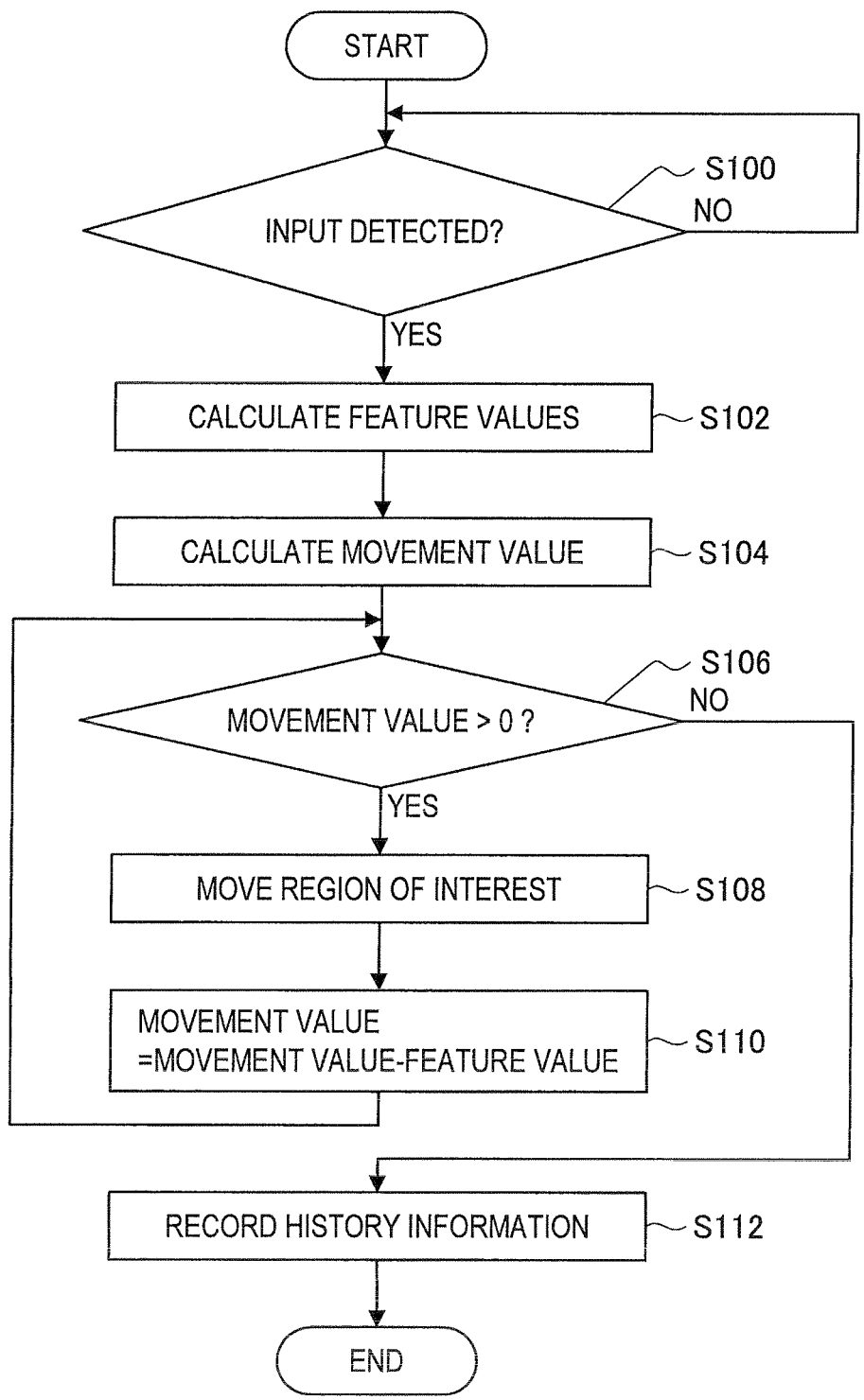
FIG. 7 is a flowchart illustrating one example of processes according to the movement control method according to the embodiment.

FIG. 7 is a flowchart illustrating one example of processes according to the movement control method according to the embodiment. Hereafter, one example of the processes according to the movement control method according to the embodiment is described, exemplifying a case where the movement control apparatus according to the embodiment performs the processes illustrated in FIG. 7. Moreover, hereafter, one example of the processes according to the movement control method according to the embodiment is described, exemplifying a case where the target in which the region of interest is provided according to the embodiment is an image.

Herein, the process in step S102 illustrated in FIG. 7 corresponds to the process (1) mentioned above (feature value calculation process), and the process in step S104 corresponds to the process (2) mentioned above (movement value calculation process). Moreover, the processes in step S106 to S110 illustrated in FIG. 7 corresponds to the process (3) mentioned above (movement control process), and the process in step S112 corresponds to the above-mentioned record control process.

The movement control apparatus according to the embodiment determines whether or not the input for moving the region of interest is detected (S100). The movement control apparatus according to the embodiment determines, for example, that the input is detected when the operation signal or the like transmitted from the operation part (mentioned later) is detected and the operation direction and operation amount are specified from the operation signal.

When it is not determined that the input is detected in step S100, the movement control apparatus according to the embodiment does not put the processing forward until it is determined that the input is detected in step S100.

Moreover, when it is determined that the input is detected in step S100, the movement control apparatus according to the embodiment calculates the feature value of the image (S102). The movement control apparatus according to the embodiment calculates, for example, the feature value of the image in the movement direction of the region of interest for each unit distance on the basis of the movement direction of the region of interest defined based on the input for moving the region of interest and the image.

Moreover, when it is determined that the input is detected in step S100, the movement control apparatus according to the embodiment calculates the movement value (S104). The movement control apparatus according to the embodiment calculates, for example, the movement value by which the region of interest is moved, on the basis of the input for moving the region of interest.

In addition, in FIG. 1, an example is presented in which the process in step S104 performed after the process in step S102 is performed, whereas the movement control apparatus according to the embodiment can independently perform the process in step S102 and the process in step S104. Therefore, the movement control apparatus according to the embodiment may, for example, perform the process in step S102 after the process in step S104, and perform the process in step S103 and the process in step S104 synchronously.

After the processes in steps S102 and S104 are performed, the movement control apparatus according to the embodiment determines whether or not the movement value is larger than 0 (or whether or not the movement value is 0 or more; similarly hereinafter) (S106). Herein, the process in step S106 corresponds to the above-mentioned process of determining whether or not the movement value is 0 or less (or whether or not it is smaller than 0).

When it is determined that the movement value is larger than 0 in step S106, the movement control apparatus according to the embodiment moves the region of interest by a unit distance (S108), and updates the value of the movement value (S110). In step S110, the movement control apparatus according to the embodiment subtracts, for example, the feature value corresponding to the unit distance by which the movement is performed in step S108 from the current movement value, and thereby, updates the value of the movement value. Then, the movement control apparatus according to the embodiment repeats the processes from step S106 again.

Moreover, when it is not determined that the movement value is larger than 0 in step S106, the movement control apparatus according to the embodiment records the history information based on the input for moving the region of interest detected in step S100 in the recording medium (S112). Then, the movement control apparatus according to the embodiment ends the processes according to the movement control method according to the embodiment corresponding to the input for moving the region of interest detected in step S100.

The movement control apparatus according to the embodiment performs, for example, the processes illustrated in FIG. 7 as the processes according to the movement control method according to the embodiment. Herein, the processes illustrated in FIG. 7 realize the process (1) mentioned above (feature value calculation process) to the process (3) mentioned above (movement control process). Therefore, by performing the processes illustrated in FIG. 7, for example, the movement control apparatus according to the embodiment can manage both accuracy of movement of the region of interest and a movement distance of the region of interest in moving the region of interest.

In addition, the processes according to the movement control method in the movement control apparatus according to the embodiment are not limited to the processes illustrated in FIG. 7. For example, in FIG. 7, an example is presented in which the movement control apparatus according to the embodiment performs the movement control process according to the first example mentioned above as the movement control process, whereas the movement control apparatus according to the embodiment may perform the movement control process according to the second example mentioned above or the movement control process according to the other example as the movement control process.

Moreover, in FIG. 7, an example is presented in which the movement control apparatus according to the embodiment performs the process in step S112 when it is not determined that the movement value is larger than 0 in step S106, whereas the movement control apparatus according to the embodiment may perform the process in step S112 in any timing after it is determined that the input is detected in step S100.

Furthermore, in FIG. 7, an example is presented in which the movement control apparatus according to the embodiment performs the process in step S112, that is, the record control process, whereas the movement control apparatus according to the embodiment is also able not to perform the record control process.

Movement Control Apparatus According to Embodiment

Figure 8:
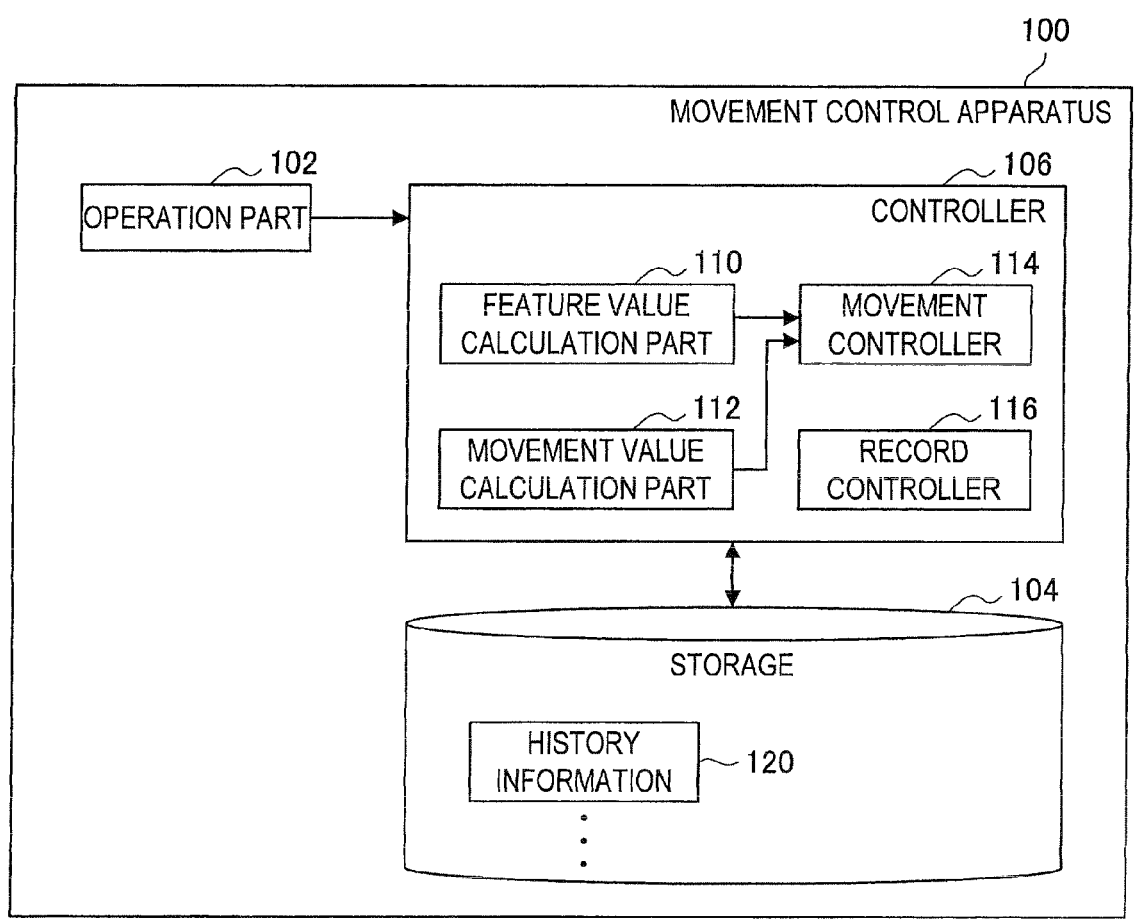
FIG. 8 is a block diagram illustrating one exemplary configuration of a movement control apparatus according to the embodiment.

Next, one exemplary configuration of the movement control apparatus according to the embodiment capable of performing the above-mentioned processes according to the movement control method according to the embodiment is described. FIG. 8 is a block diagram illustrating one exemplary configuration of a movement control apparatus 100 according to the embodiment.

The movement control apparatus 100 includes, for example, an operation part 102, a storage 104 and a controller 106.

Moreover, the movement control apparatus 100 may include, for example, a ROM (Read Only Memory; not shown), a RAM (Random Access Memory; not shown), a display part (not shown) displaying various screens on the display screen, a communication part (not shown), and the like. The movement control apparatus 100 connects the above-mentioned individual constituents, for example, via a bus as a transmission path of data.

Herein, the ROM (not shown) stores data for control such as programs and operation parameters used by the controller 106. The RAM (not shown) temporarily stores the programs executed by the controller 106, and the like.

The display part (not shown) is display means included in the movement control apparatus 100, and displays various kinds of information (for example, images and/or characters) on the display screen. The screen displayed on the display screen of a display part (not shown) can include, for example, an operation screen for the user performing input for moving the region of interest for movement, an operation screen for causing the movement control apparatus 100 to perform desired operation, and the like.

Herein, the display part (not shown) can include, for example, a display device such as a liquid crystal display (Liquid Crystal Display) and an organic EL display (Organic Electro-Luminescence display; otherwise also referred to as OLED display (Organic Light Emitting Diode display)). Moreover, the movement control apparatus 100 can also include the display part (not shown), for example, configured of a touch screen. In the above-mentioned case, the display part (not shown) is to function as an operation and display part operable of both the user's operation and display.

The communication part (not shown) is communication means included in the movement control apparatus 100, and communicates with an external apparatus such as an external operation device and a server via a network (or directly) in a wireless/wired manner. Herein, the communication part (not shown) can include, for example, a communication antenna and an RF (Radio Frequency) circuit (wireless communication), an IEEE802.15.1 port and a transceiver circuit (wireless communication), an IEEE802.11b port and a transceiver circuit (wireless communication), a LAN terminal and a transceiver circuit (wired communication), and the like.

[Hardware Configuration Example of Movement Control Apparatus 100]

Figure 9:
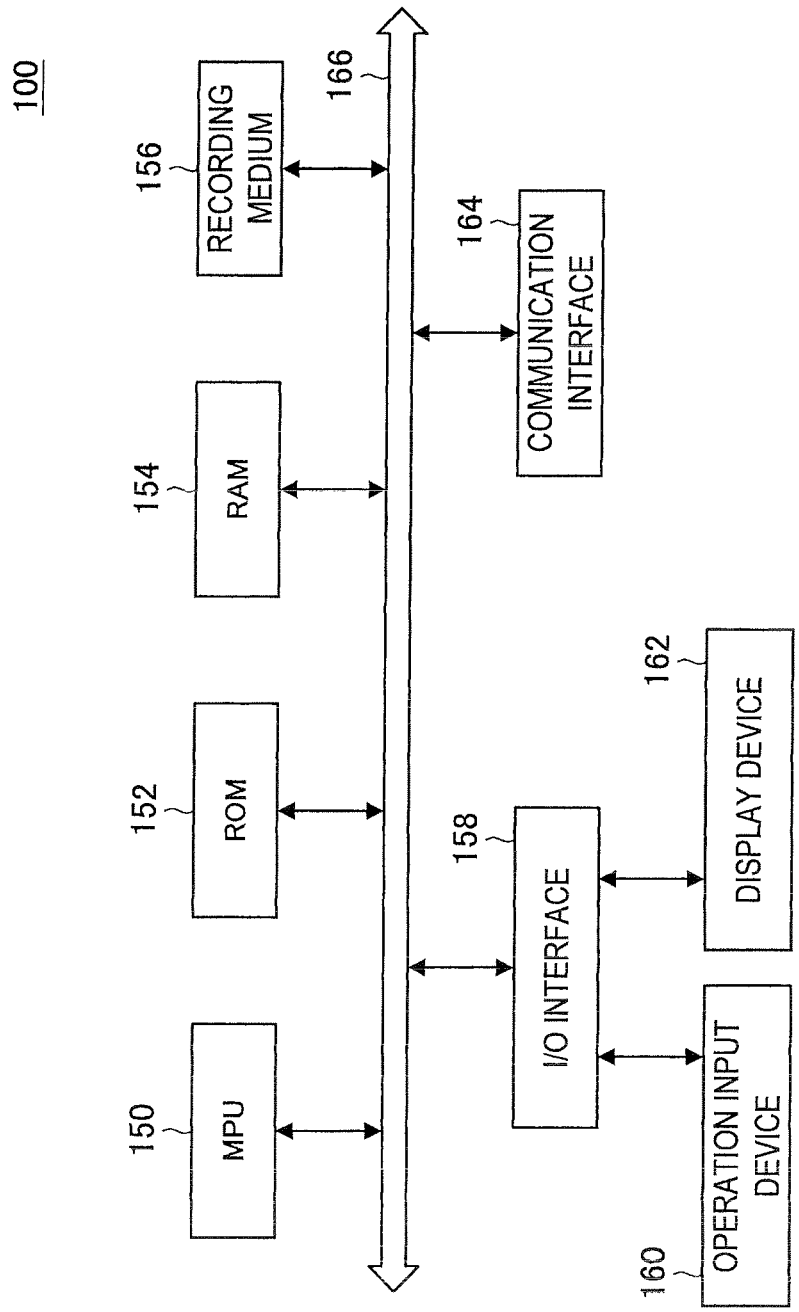
FIG. 9 is an explanatory drawing illustrating one example of a hardware configuration of the movement control apparatus according to the embodiment.

FIG. 9 is an explanatory drawing illustrating one example of a hardware configuration of the movement control apparatus 100 according to the embodiment.

The movement control apparatus 100 includes, for example, an MPU 150, a ROM 152, a RAM 154, a recording medium 156, an I/O interface 158, an operation input device 160, a display device 162 and a communication interface 164. Moreover, the movement control apparatus 100 connects the individual constituents, for example, via a bus 166 as a transmission path of data.

The MPU 150 is configured of, for example, an MPU (Micro Processing Unit), various processing circuits and the like, and functions as the controller 106 controlling the whole movement control apparatus 100. Moreover, the MPU 150 serves as, for example, a feature value calculation part 110, a movement value calculation part 112, a movement controller 114 and a record controller 116 mentioned later in the movement control apparatus 100.

The ROM 152 stores data for control such as programs and operation parameters used by the MPU 150, and the like. The RAM 154 temporarily stores, for example, the programs executed by the MPU 150, and the like.

The recording medium 156 functions as the storage 104, and stores, for example, various kinds of data such as history information and applications. Herein, the recording medium 156 can include, for example, a magnetic recording medium such as a hard disk drive (Hard Disk), and a non-volatile memory (nonvolatile memory) such as an EEPROM (Electrically Erasable and Programmable Read Only Memory) and a flash memory. Moreover, the recording medium 156 may be removable from the movement control apparatus 100.

The I/O interface 158 connects, for example, the operation input device 160 and/or the display device 162. The operation input device 160 functions as the operation part 102. Moreover, the display device 162 functions as the display part (not shown).

Herein, the I/O interface 158 includes, for example, a USB (Universal Serial Bus) terminal, a DVI (Digital Visual interface) terminal, an HDMI (High-Definition Multimedia interface) terminal, various kinds of processing circuits, and the like. Moreover, the operation input device 160 is provided, for example, in the movement control apparatus 100, and connected to the I/O interface 158 inside the movement control apparatus 100. The operation input device 160 can include, for example, buttons, direction keys, a lever, a rotational selector such as a jog dial, a combination of these, and the like. Moreover, the display device 162 is provided, for example, in the movement control apparatus 100, and connected to the I/O interface 158 inside the movement control apparatus 100. The display device 162 can include, for example, a liquid crystal display, an organic EL display and the like.

In addition, it is needless to say that the I/O interface 158 can be connected to external devices such as an operation input device as an external apparatus of the movement control apparatus 100 (for example, a keyboard and/or a mouse), and a display device. Moreover, the display device 162 may be a device which is a touch screen or the like, for example, and is operable for display and user operation.

The communication interface 164 is communication means included in the movement control apparatus 100, and functions as a communication part (not shown) for communicating with external apparatuses such as an external operation device and a server via a network (or directly) in a wireless/wired manner. Herein, the communication interface 164 can include, for example, a communication antenna and an RF circuit (wireless communication), a LAN terminal and a transceiver circuit (wired communication), and the like.

The movement control apparatus 100 performs the processes according to the movement control method according to the embodiment, employing the configuration illustrated in FIG. 9, for example.

In addition, the hardware configuration of the movement control apparatus 100 according to the embodiment is not limited to the configuration illustrated in FIG. 9. For example, the movement control apparatus 100 may not include a communication device 164 in case of a configuration of performing the processes in a stand-alone manner. Moreover, the movement control apparatus 100 can have, for example, a configuration of not including one or two or more devices out of the recording medium 156, operation device 160 and display device 162.

Again, with reference to FIG. 8, one exemplary configuration of the movement control apparatus 100 is described. The operation part 102 is operation means allows user operation and is included in the movement control apparatus 100. The operation part 102 transmits, for example, an operation signal in response to the given operation to the controller 106. The movement control apparatus 100 enables the user operation by having the operation part 102, and can perform processes such, for example, as movement of the region of interest for movement according to the user operation, which processes the user wants. Herein, the operation part 102 can include, for example, buttons, direction keys, a lever, a rotational selector such as a jog dial, a combination of these, and the like.

The storage 104 is memory means included in the movement control apparatus 100, and stores, for example, various data such as history information and applications. FIG. 8 illustrates an example of history information 120, . . . , stored in the storage 104.

Herein, the storage 104 can includes, for example, a magnetic recording medium such as a hard disk drive, a non-volatile memory such as a flash memory, and the like. Moreover, the storage 104 may be removable from the movement control apparatus 100.

The controller 106 is configured of, for example, an MPU, various kinds of processing circuits, and the like, and controls the whole movement control apparatus 100. Moreover, the controller 106 includes, for example, the feature value calculation part 110, movement value calculation part 112, movement controller 114 and record controller 116, and plays a leading role in performing the processes according to the movement control method according to the embodiment.

The feature value calculation part 110 plays a leading role in performing the process (1) mentioned above (feature value calculation process), and calculates feature values of a target in which a region of interest is provided in a movement direction of the region of interest for individual unit distances on the basis of the movement direction of the region of interest defined based on input for moving the region of interest and the target in which the region of interest is provided such as an image. Herein, the feature value calculation part 110 specifies an operation direction, for example, on the basis of an operation signal transmitted from the operation part 102 and/or an external operation signal received from an external operation device or the like, and sets the specified operation direction as the movement direction of the region of interest.

Moreover, the feature value calculation part 110 transmits, for example, a signal (or data) indicating the calculated feature values to the movement controller 114.

The movement value calculation part 112 plays a leading role in performing the process (2) mentioned above (movement value calculation process), and calculates a movement value by which the region of interest is moved, on the basis of the input for moving the region of interest. Herein, the movement value calculation part 112 specifies, for example, an operation amount on the basis of an operation signal transmitted from the operation part 102 and/or an external operation signal received from the external operation device or the like, and calculates the movement value on the basis of the specified operation amount.

The movement value calculation part 112 transmits, for example, a signal (or data) indicating the movement value to the movement controller 114.

The movement controller 114 plays a leading role in performing the process (3) mentioned above (movement control process), and moves the region of interest in the movement direction specified from the operation signal or the like on the basis of the feature value calculated by the feature value calculation part 110 and the movement value calculated by the movement value calculation part 112. Herein, the movement controller 114 may, for example, move the region of interest displayed on the display screen of the display part (not shown), or move the region of interest displayed on the display screen of the external display apparatus connected via a network (or directly) in a wired or wireless manner. When moving the region of interest displayed on the display screen of the external display apparatus, the movement controller 114 transmits, for example, a control signal for moving the region of interest to the communication part (not shown).

The record controller 116 plays a leading role in performing the above-mentioned record control process, and records, for example, history information in the storage 104, external recording medium, external apparatus, or the like using the operation signal or the like transmitted from the operation part 102 when the input for moving the region of interest is detected.

The controller 106 includes, for example, the feature value calculation part 110, movement value calculation part 112, movement controller 114 and record controller 116, and thereby, plays a leading role in performing the processes according to the movement control method according to the embodiment.

In addition, the configuration of the controller according to the embodiment is not limited to the above. For example, the controller according to the embodiment may not include the record controller 116. Even in case of the record controller 116 not being included, the controller according to the embodiment can play a leading role in performing the process (1) mentioned above (feature value calculation process) to the process (3) mentioned above (movement control process) according to the movement control method according to the embodiment.

The movement control apparatus 100 performs the processes according to the movement control method according to the embodiment (for example, the process (1) mentioned above (feature value calculation process) to the process (3) mentioned above (movement control process) and the record control process), employing the configuration illustrated in FIG. 8, for example. Accordingly, the movement control apparatus 100 can manage both accuracy of movement of a region of interest and a movement distance of the region of interest in moving the region of interest, employing the configuration illustrated in FIG. 8, for example.

In addition, the configuration of the movement control apparatus according to the embodiment is not limited to the configuration illustrated in FIG. 8. For example, the movement control apparatus according to the embodiment may not include the operation part 102 illustrated in FIG. 8. Even in case of the operation part 102 not being included, the movement control apparatus according to the embodiment can perform, for example, the process (1) mentioned above (feature value calculation process) to the process (3) mentioned above (movement control process) on the basis of the external operation signal received from the external operation device or the like such as a remote controller. Therefore, even in the case of the operation part 102 not being included, the movement control apparatus according to the embodiment can attain the similar effect to that of the movement control apparatus 100 illustrated in FIG. 8.

Moreover, the movement control apparatus according to the embodiment may not include the storage 104 illustrated in FIG. 8. Even in case of the storage 104 not being included, the movement control apparatus according to the embodiment can perform, for example, the process (1) mentioned above (feature value calculation process) to the process (3) mentioned above (movement control process). Moreover, in the case of the storage 104 not being included, the movement control apparatus according to the embodiment can perform, for example, the above-mentioned record control process by recording history information in the external recording medium or external apparatus. Therefore, in the case of the storage 104 not being included, the movement control apparatus according to the embodiment can attain the similar effect to that of the movement control apparatus 100 illustrated in FIG. 8.

Moreover, the movement control apparatus according to the embodiment can separately include, for example, one or two or more of the constituents out of the feature value calculation part 110, movement value calculation part 112, movement controller 114 and record controller 116 illustrated in FIG. 8 (for example, realize those using separate processing circuits).

Furthermore, the movement control apparatus according to the embodiment may not include the record controller 116 illustrated in FIG. 8 as mentioned above. Even in case of the record controller 116 not being included, the movement control apparatus according to the embodiment can play a leading role in performing the process (1) mentioned above (feature value calculation process) to the process (3) mentioned above (movement control process) according to the movement control method according to the embodiment. Accordingly, even in the case of the record controller 116 not being included, the movement control apparatus according to the embodiment can attain the similar effect to that of the movement control apparatus 100 illustrated in FIG. 8.

As above, the movement control apparatus according to the embodiment performs, for example, the process (1) mentioned above (feature value calculation process) to the process (3) mentioned above (movement control process) as the processes according to the movement control method according to the embodiment. Herein, in the process (3) mentioned above (movement control process), the movement control apparatus according to the embodiment moves the region of interest in the movement direction specified from the operation signal or the like on the basis of the feature value calculated in the process (1) mentioned above (feature value calculation process) and the movement value calculated in the process (2) mentioned above (movement value calculation process). Therefore, for example, as illustrated in FIG. 1 and FIG. 2, the movement control apparatus according to the embodiment can move the region of interest more preferentially for the movement distance of the region of interest as the feature value of the image (one example of a target in which a region of interest is provided) is smaller, and can move the region of interest more preferentially for accuracy of movement of the region of interest as the feature value of the image is larger.

Accordingly, the movement control apparatus according to the embodiment performs, for example, the process (1) mentioned above (feature value calculation process) to the process (3) mentioned above (movement control process), and thereby, can manage both accuracy of movement of the region of interest and a movement distance of the region of interest in moving the region of interest.

As above, the embodiment has been described, exemplifying the movement control apparatus, whereas the embodiment is not limited to such a configuration. The embodiment can be applied, for example, to various kinds of equipment such as a communication apparatus such as a mobile phone and a smart phone, a video/music playback apparatus (or a video/music recording/playing-back apparatus), a game machine, a computer such as a PC (Personal Computer) and a server, a display apparatus such as a TV receiver, an image capturing apparatus such as a digital camera, a moving body such as a vehicle. Moreover, the embodiment can also be applied, for example, to processing ICs (Integrated Circuits) capable of being implemented in the equipment as mentioned above.

Program According to Embodiment

A program for causing a computer to function as the movement control apparatus according to the embodiment (for example, a program capable of executing the processes according to the movement control method according to the embodiment such as the process (1) mentioned above (feature value calculation process) to the process (3) mentioned above (movement control process)) is executed in the computer, and thereby, both accuracy of movement and a distance of the movement can be managed.

It should be understood by those skilled in the art that various modifications, combinations, sub-combinations and alterations may occur depending on design requirements and other factors insofar as they are within the scope of the appended claims or the equivalents thereof.

For example, in the above, it is described to provide a program (computer program) for causing a computer to function as the movement control apparatus according to the embodiment, whereas the embodiment can also further provide a recording medium in which the above-mentioned program is stored, simultaneously.

The above-mentioned configurations represent one example of the embodiment and fall under the technical scope of the present disclosure in the nature of things.

Additionally, the present technology may also be configured as below.

(1) A movement control apparatus including:

a feature value calculation part calculating, on a basis of a movement direction of a region of interest defined based on input for moving the region and a target in which the region is provided, a feature value of the target in which the region is provided in the movement direction of the region on a per-unit distance basis regarding movement of the region;

a movement value calculation part calculating a movement value by which the region is moved, based on the input; and a movement controller moving the region in the movement direction based on the calculated feature value and the calculated movement value.

(2) The movement control apparatus according to (1), wherein the movement controller moves the region by the unit distance in the movement direction, subtracts the feature value corresponding to the unit distance by which the movement has been made from the movement value, when the value obtained by the subtraction is not 0 or less or is not smaller than 0, moves the region by the unit distance again in the movement direction and subtracts the feature value corresponding to the unit distance by which the movement has been made again from the movement value, and when the value obtained by the subtraction is 0 or less or is smaller than 0, ends the movement of the region.

(3) The movement control apparatus according to (1), wherein the movement controller sequentially subtracts the feature value for each unit distance from the movement value in the movement direction, and moves the region by a distance obtained by multiplying a number of times of subtraction at a time when the value obtained by the subtraction is 0 or less or is smaller than 0 and the unit distance.

(4) The movement control apparatus according to according to any one of (1) to (3),
wherein the movement value calculation part adjusts the movement value calculated based on the input, on a basis of history information indicating history of the input.
(5) The movement control apparatus according to according to any one of (1) to (4),
wherein the target in which the region is provided is an image, and
wherein the region is a region defining a region in which the image undergoes trimming.
(6) The movement control apparatus according to according to any one of (1) to (5), further including
a record controller recording history information indicating history of the input.
(7) A movement control method including:
calculating, on a basis of a movement direction of a region of interest defined based on input for moving the region and a target in which the region is provided, a feature value of the target in which the region is provided in the movement direction of the region on a per-unit distance basis regarding movement of the region;
calculating a movement value by which the region is moved, based on the input; and
moving the region in the movement direction based on the calculated feature value and the calculated movement value.
(8) A program for causing a computer to execute:
calculating, on a basis of a movement direction of a region of interest defined based on input for moving the region and a target in which the region is provided, a feature value of the target in which the region is provided in the movement direction of the region on a per-unit distance basis regarding movement of the region;
calculating a movement value by which the region is moved, based on the input; and
moving the region in the movement direction based on the calculated feature value and the calculated movement value.

The present disclosure contains subject matter related to that disclosed in Japanese Priority Patent Application JP 2012-084728 filed in the Japan Patent Office on Apr. 3, 2012, the entire content of which is hereby incorporated by reference.

What is claimed is:

1. A movement control apparatus comprising:
one or more processors operable to:
calculate a feature value of a target, in which a region of interest is provided, in a movement direction of the region of interest for each unit distance, based on the movement direction of the region of interest, wherein the movement direction of the region of interest is defined based on an input for moving the region of interest, and the target in which the region of interest is provided;
calculate a movement value for the region of interest, based on the input for moving the region of interest; and
move the region of interest in the movement direction by a movement distance, based on the calculated feature value and the calculated movement value,
wherein the region of interest is moved by a first movement distance when the calculated feature value is a first feature value, and the region of interest is moved by a second movement distance when the calculated feature value is a second feature value, and
wherein when the first feature value is smaller than the second feature value, the first movement distance is larger than the second movement distance.

2. The movement control apparatus according to claim 1, wherein the one or more processors are operable to:
move the region of interest by the unit distance in the movement direction,
subtract the calculated feature value corresponding to the unit distance by which the movement has been made, from the calculated movement value,
when a value obtained by the subtraction is not 0 or is not smaller than 0, move the region of interest by the unit distance again in the movement direction and subtract the calculated feature value corresponding to the unit distance by which the movement has been made again from the calculated movement value, and
when the value obtained by the subtraction is 0 or is smaller than 0, end the movement of the region of interest.

3. The movement control apparatus according to claim 1, wherein the one or more processors are operable to:
sequentially subtract the calculated feature value for each unit distance from the calculated movement value in the movement direction, and
move the region of interest by a distance obtained by multiplying the unit distance by subtraction times when a value obtained by the sequential subtraction is 0 or is smaller than 0.

4. The movement control apparatus according to claim 1, wherein the one or more processors are operable to adjust the calculated movement value, on a basis of history information indicating history of the input for moving the region of interest.

5. The movement control apparatus according to claim 1, wherein the target in which the region of interest is provided is an image, and
wherein the region of interest is a region in which the image undergoes trimming.

6. The movement control apparatus according to claim 1, wherein the one or more processors are further operable to:
record history information indicating history of the input for moving the region of interest.

7. The movement control apparatus according to claim 1, wherein the region of interest is a portion of the target, and is displayed on a display screen.

8. The movement control apparatus according to claim 1, wherein a shape of the region of interest is one of circular, rectangular, elliptical, or trapezoidal.

9. The movement control apparatus according to claim 1, wherein a size of the region of interest is fixed.

10. The movement control apparatus according to claim 1, wherein the one or more processors are further operable to change a size of the region of interest.

11. The movement control apparatus according to claim 1, wherein the one or more processors are further operable to move an upper side of the region of interest, wherein a lower side of the region of interest is fixed.

12. The movement control apparatus according to claim 11,
wherein the one or more processors are further operable to move the upper side of the region of interest by a third movement distance when the calculated feature value is a third feature value, and move the upper side of the region of interest by a fourth movement distance when the calculated feature value is a fourth feature value,
wherein when the third feature value is smaller than the fourth feature value, the third movement distance is larger than the fourth movement distance.

13. The movement control apparatus according to claim 1, wherein the feature value of the target is calculated based on pixel differences between adjacent pixels in the movement direction in the target.

14. A movement control method implemented on a computer, comprising:
   calculating a feature value of a target, in which a region of interest is provided, in a movement direction of the region of interest for each unit distance, based on the movement direction of the region of interest, wherein the movement direction is defined based on an input for moving the region of interest, and the target in which the region of interest is provided;
   calculating a movement value for the region of interest, based on the input for moving the region of interest; and
   moving the region of interest in the movement direction by a movement distance, based on the calculated feature value and the calculated movement value,
   wherein the region of interest is moved by a first movement distance when the calculated feature value is a first feature value, and the region of interest is moved by a second movement distance when the calculated feature value is a second feature value, and
   wherein when the first feature value is smaller than the second feature value, the first movement distance is larger than the second movement distance.

15. A non-transitory computer readable storage medium having stored thereon, a computer program, the computer program when executed by a computer causes the computer to perform steps comprising:
   calculating a feature value of a target, in which a region of interest is provided, in a movement direction of the region of interest for each unit distance, based on the movement direction of the region of interest, wherein the movement direction is defined based on an input for moving the region of interest, and the target in which the region of interest is provided;
   calculating a movement value for the region of interest, based on the input for moving the region of interest; and
   moving the region of interest in the movement direction by a movement distance, based on the calculated feature value and the calculated movement value,
   wherein the region of interest is moved by a first movement distance when the calculated feature value is a first feature value, and the region of interest is moved by a second movement distance when the calculated feature value is a second feature value, and
   wherein when the first feature value is smaller than the second feature value, the first movement distance is larger than the second movement distance.

* * * * *